J. G. SJÖSTRÖM.
MATCH SPLINT PARALLELIZING MACHINE.
APPLICATION FILED NOV. 5, 1909.

1,014,914.

Patented Jan. 16, 1912.
11 SHEETS—SHEET 1.

Witnesses

Inventor
John G. Sjöström

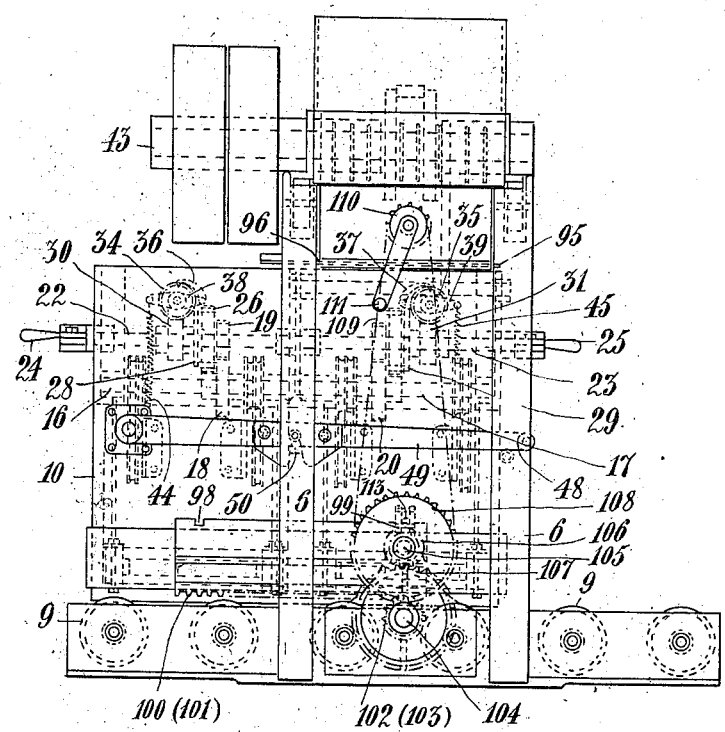

J. G. SJÖSTRÖM.
MATCH SPLINT PARALLELIZING MACHINE.
APPLICATION FILED NOV. 5, 1909.
1,014,914.
Patented Jan. 16, 1912.
11 SHEETS—SHEET 3.
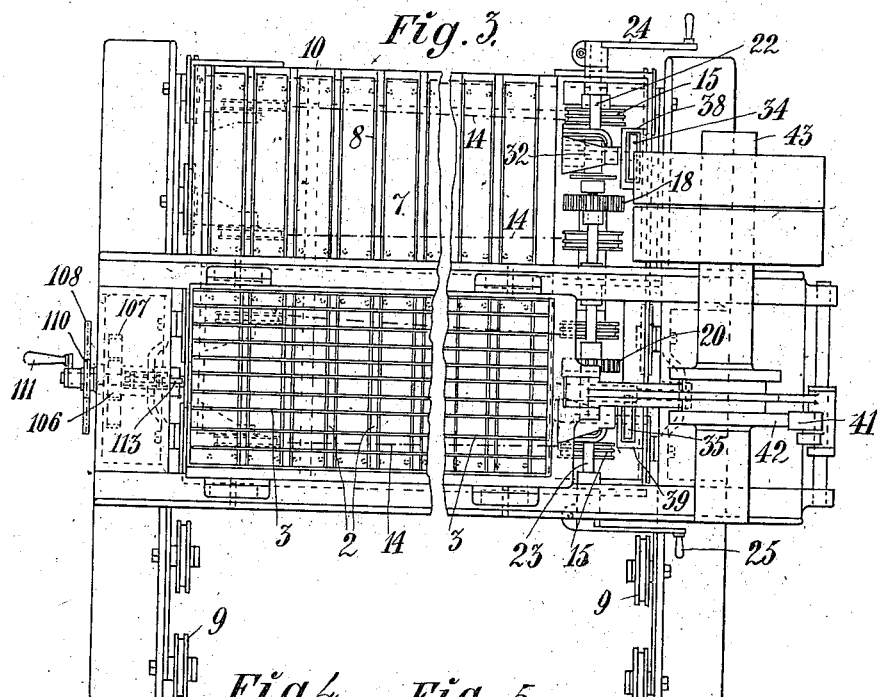
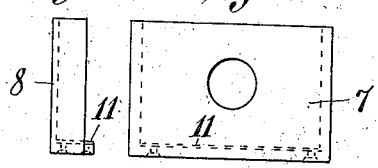
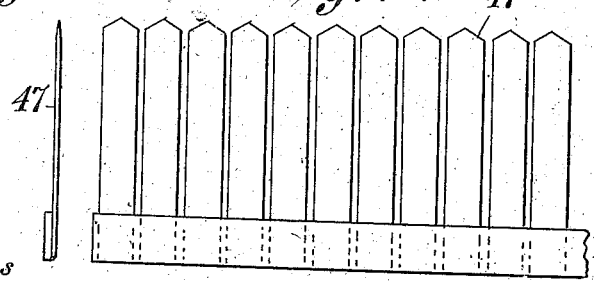
Witnesses
Inventor

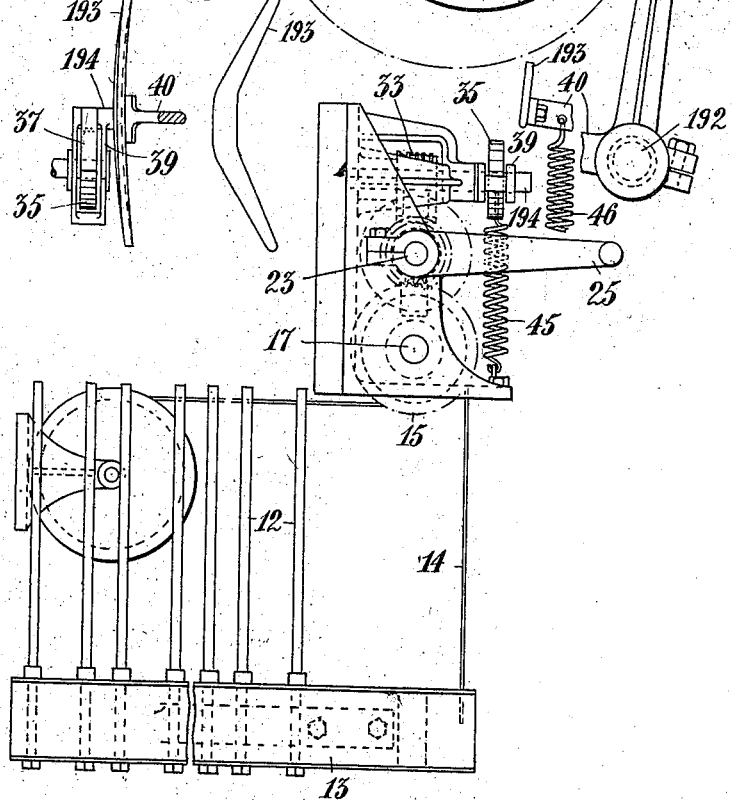

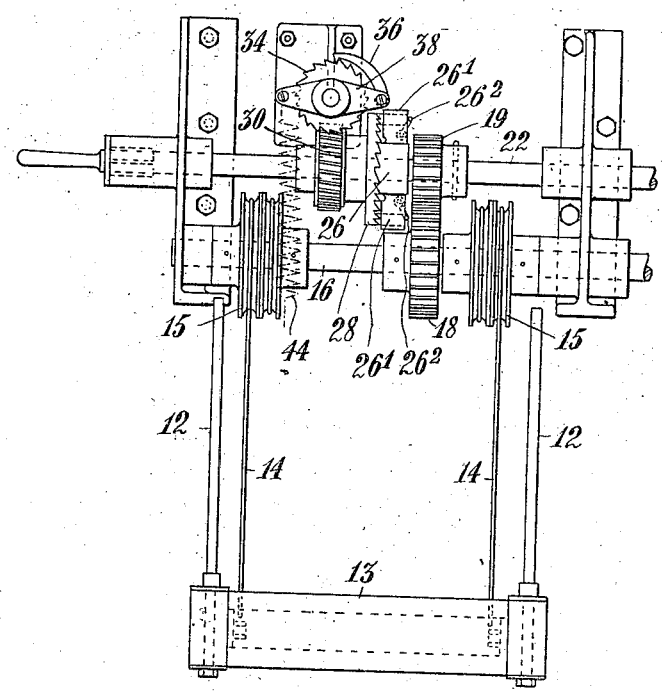

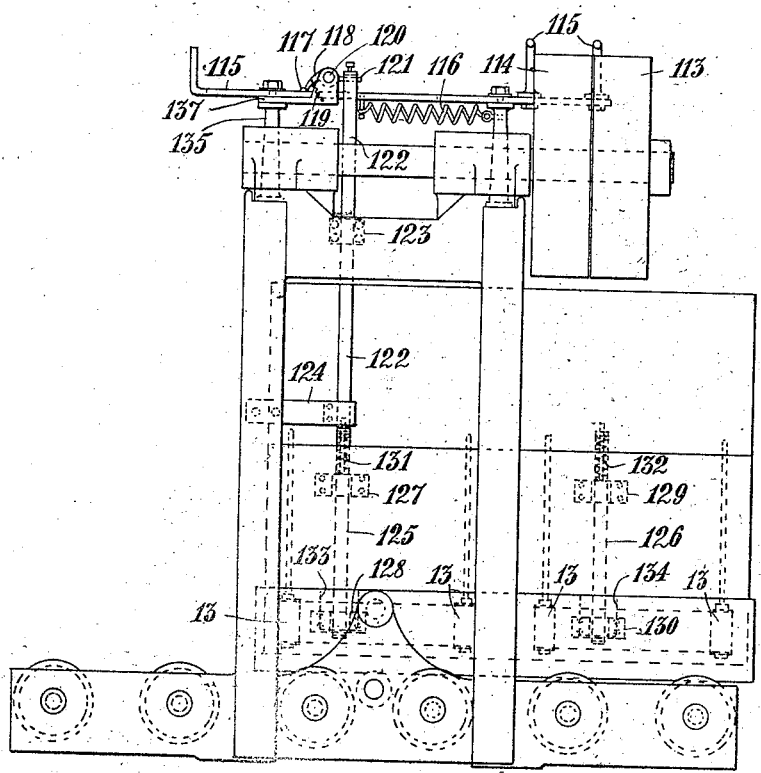

J. G. SJÖSTRÖM.
MATCH SPLINT PARALLELIZING MACHINE.
APPLICATION FILED NOV. 5, 1909.

1,014,914.

Patented Jan. 16, 1912.
11 SHEETS—SHEET 8.

Witnesses

Inventor

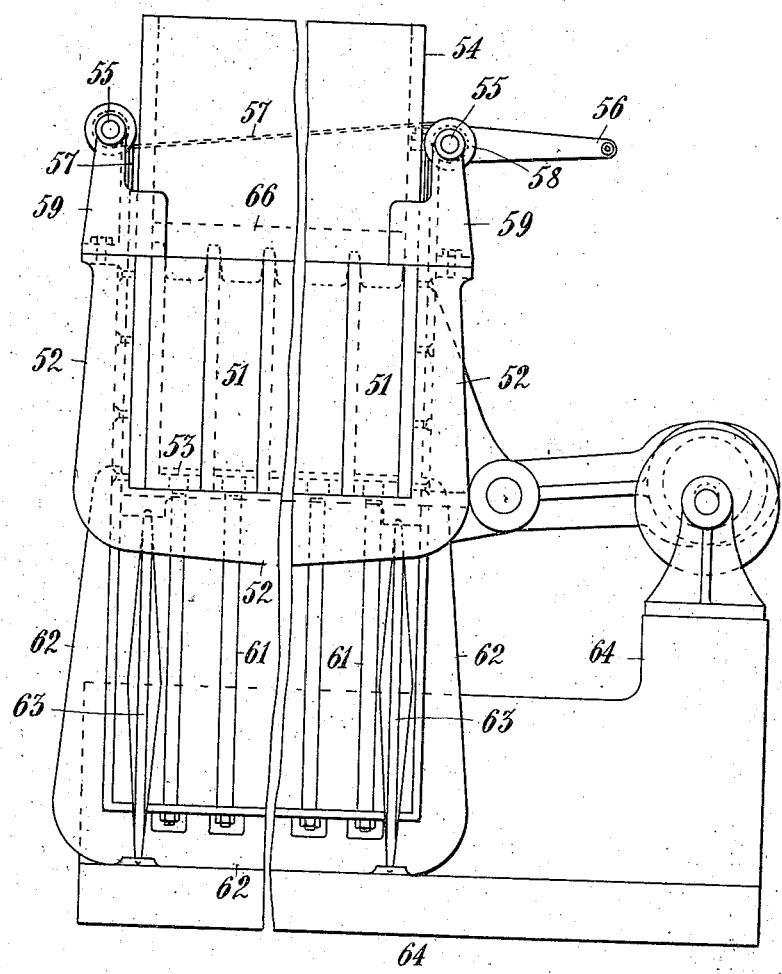

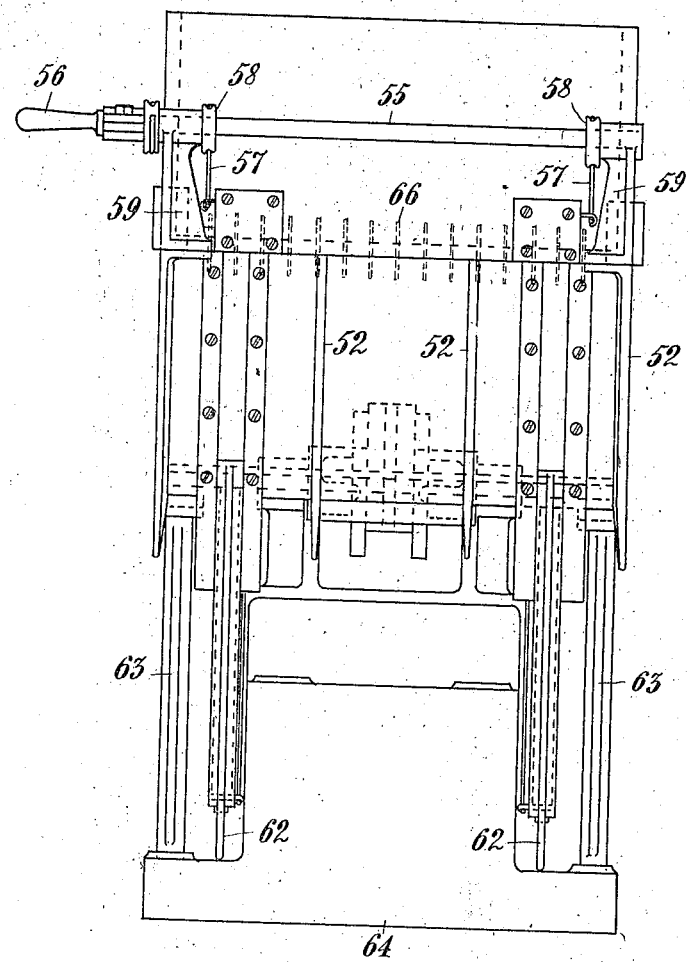

J. G. SJÖSTRÖM.
MATCH SPLINT PARALLELIZING MACHINE.
APPLICATION FILED NOV. 5, 1909.
1,014,914.
Patented Jan. 16, 1912.
11 SHEETS—SHEET 11.
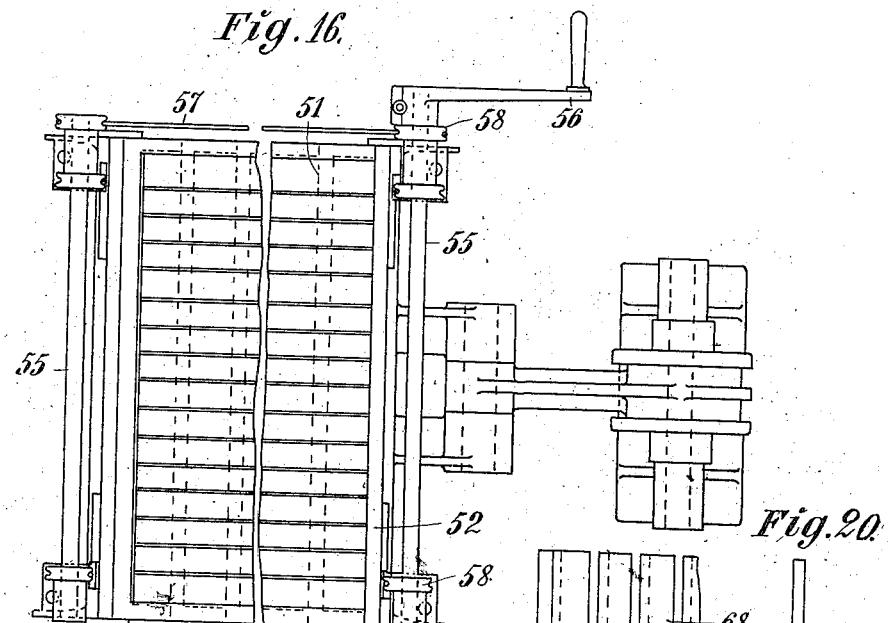
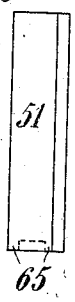
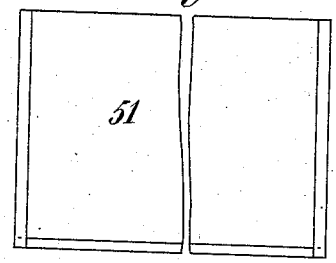
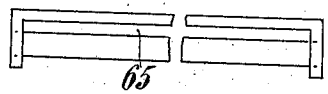

UNITED STATES PATENT OFFICE.

JOHN GOTTHARD SJÖSTRÖM, OF JÖNKÖPING, SWEDEN.

MATCH-SPLINT-PARALLELIZING MACHINE.

1,014,914. Specification of Letters Patent. Patented Jan. 16, 1912.

Application filed November 5, 1909. Serial No. 526,461.

*To all whom it may concern:*

Be it known that I, JOHN GOTTHARD SJÖSTRÖM, a subject of the King of Sweden, residing at Jönköping, in the Kingdom of Sweden, have invented new and useful Improvements in Match-Splint-Parallelizing Machines, of which the following is a specification, reference being had to the drawings accompanying and forming a part hereof.

This invention relates to machines for assembling match splints into piles, in which the splints will all lie in one and the same direction. In the machines of this kind hitherto known the match splints will be lying, after the raising or removal of the cell-box, in small piles on the machine table. From the table the splints must be placed by hand into the cells or trays in which the same are held until they are to be filled into the magazine of the machine for placing the splints in the dipping frames.

The object of the invention is to avoid the delay and expense of filling of the cells by hand and provide a machine which parallelizes the splints in certain removable cells in which the splints are held in order to be thereupon inserted into the machine for filling the dipping frames.

Figure 1:
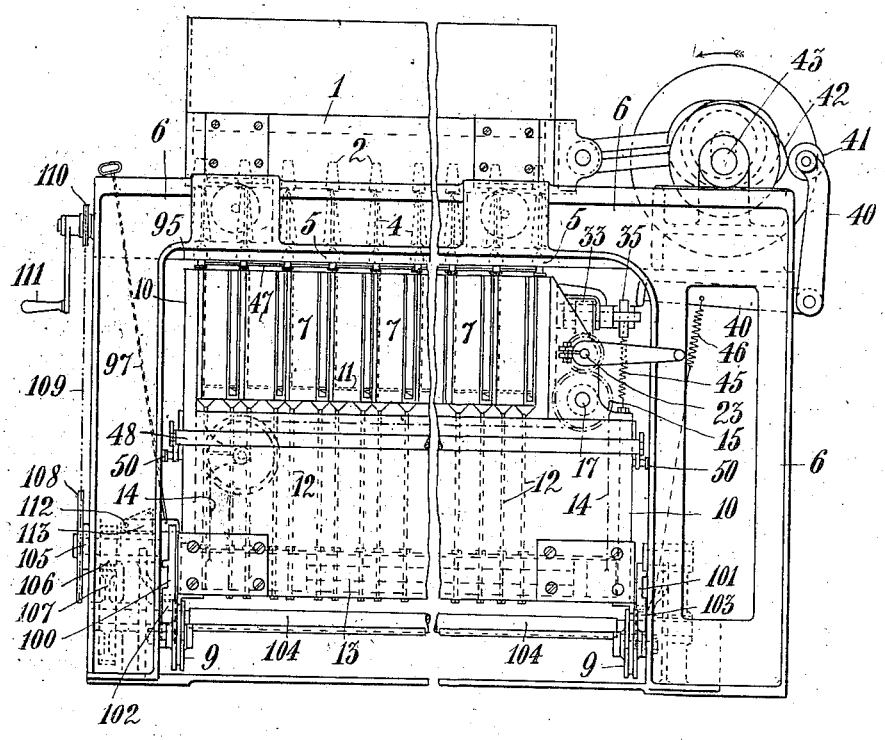
Figure 11:
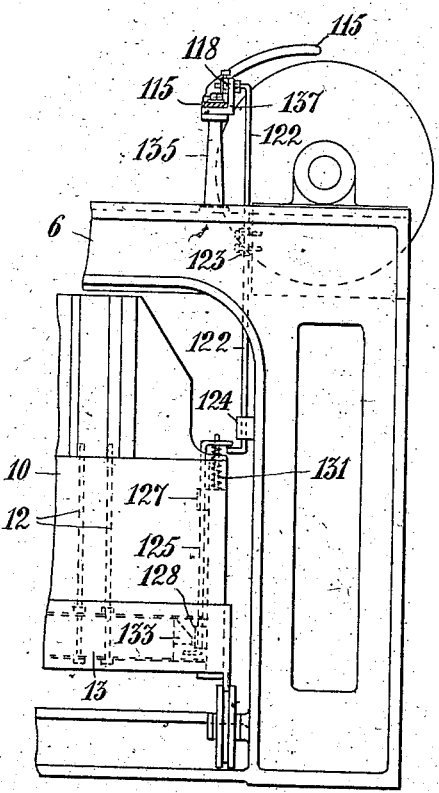
Figure 12:
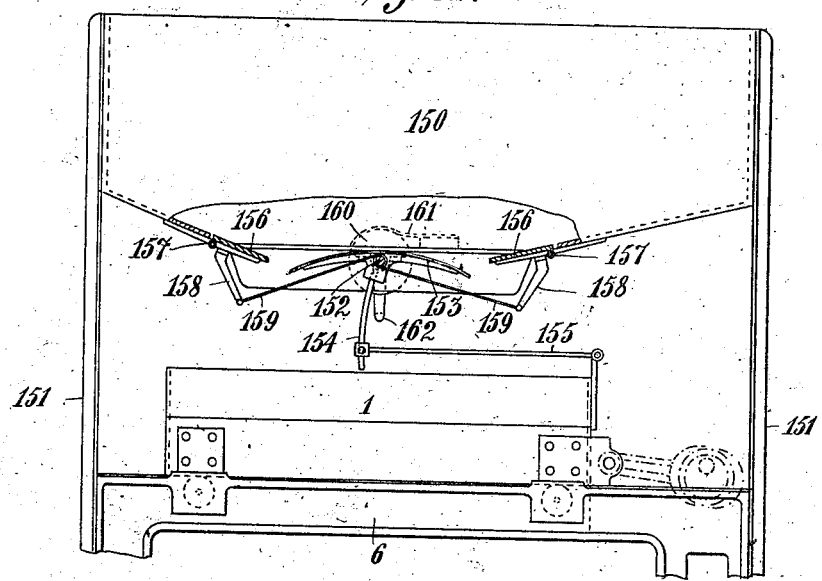
Figure 13:
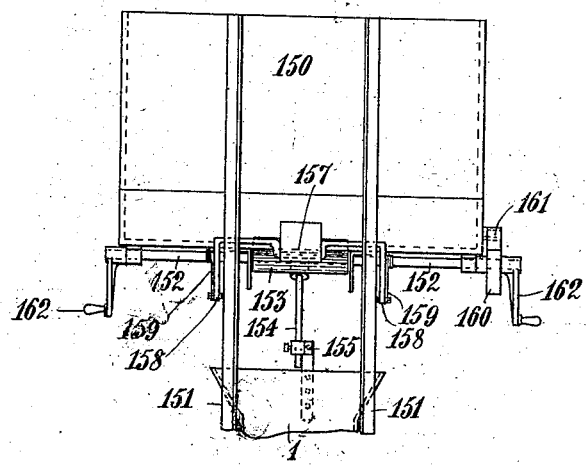

In the drawings, Figures 1–3 show one embodiment of the machine in side elevation, front view and plan view, respectively. Figs. 4 and 5 are end-view and side-view, respectively, of the trays adapted to be inserted into the machine for receiving and holding the parallelly arranged match splints. Fig. 6 is a side elevation of the mechanism for automatically lowering the movable bottoms of the trays. Fig. 7 is a plan view of a feed device appertaining to the said mechanism. Fig. 8 is an end-view, from the lefthand side of Fig. 6, of the head of the cam-actuated lever 40 appertaining to the same mechanism. Fig. 9 is a front view of the said mechanism for automatically lowering the movable bottoms of the trays. Fig. 10 is a rear view of the machine showing the mechanism for throwing same out of operation when a set of trays has been filled. Fig. 11 is a side view of the same mechanism. Figs. 12 and 13 are front view and side view, respectively, of a hopper placed above the cell-box for supplying match splints to the latter. Figs. 14–16 show a second embodiment of the machine in side elevation, front view and plan view, respectively. Figs. 17–19 are end-view, side view and plan view, respectively, of a modified construction of the splint-receiving trays. Figs. 20 and 21 are end-view and plan view, respectively, of a carriage and trays forming a further modification of the splint-receiving mechanism. Figs. 22 and 23 are end-view and plan view, respectively, of a set of knives adapted to be inserted just above the filled trays to be exchanged in order to prevent the overlying match splints from dropping.

Referring to Figs. 1–13 of the drawings, 1 is a magazine or cell-box to which the match splints are supplied by hand or from a suitable hopper (see Figs. 12 and 13). The magazine or cell-box consists of a suitably square frame which is reciprocated horizontally, for instance by an eccentric, in a direction parallel to the longitudinal direction of the match splints after parallelizing. The lower part of the frame is divided by longitudinal and transverse laths 2, 3 (Figs. 1 and 3) into a number of compartments or cells. When the frame is agitated, the splints will place themselves parallel. The transverse laths 2 grip about the upper part of the underlying movable partition walls 4. These partition walls are standing with their edge-shaped lower parts in grooves at the upper side of other transverse laths 5 attached with their ends to the machine frame 6. Placed immediately below the said laths 5 are the trays 7 (Figs. 4 and 5), the longitudinal sides 8 of said trays lying just beneath the laths 5.

In the embodiment shown the trays are placed in two rows on a carriage 10 running on rollers 9. Thereby the advantage is gained that the one filled row may be withdrawn and exchanged while the other is being filled, by which the output of the machine is considerably increased. In order to cause the trays to be automatically filled, the trays may be provided with loose bottoms or disks 11 which may be raised by the standards 12 up to the upper edges of the trays just below the laths 5 and thereupon automatically lowered.

The raising and lowering of the bottoms is performed in the following manner: The standards 12 carrying the bottoms are attached to a frame 13 common to each separate series of trays, so that each series will obtain a separate raising and lowering device. The raising and lowering of the frame is performed by strings or cords 14 attached to the edges of the frame, said strings or cords being wound around pulleys 15 in such a manner that the said movements of the frame are performed by turning the disks in one or the other direction. The pulleys 15 are attached to axles or shafts 16 and 17 one of which is placed in the prolongation of the other. These axles or shafts are driven by cog-wheels 18 and 19 or 20 and 21, respectively, from the axles 22 and 23. The raising of the bottoms 11 is performed by hand by turning the cranks 24 and 25 attached to the said axles. For automatically lowering the bottoms, double arms 26, 27 having axially movable ratchet pawls 26' are attached to the axles 22, 23, said ratchet pawls being pressed by springs 26² against the ratchet wheels 28, 29. These ratchet wheels are firmly connected to the worm wheels 30 and 31 and run with the same loosely on the shafts 22, 23. Engaging the worm wheels are worms 32, 33 (Fig. 6) driven by ratchet wheels 34, 35, pawls 36, 37 and arms 38, 39. The arms 38, 39 are actuated by the angle lever 40 (Figs. 1 and 6) bearing with a roller 41 on a cam 42 of the driving shaft 43 of the machine. The arms 38, 39 and the angle lever 40 are spring-operated so as to be caused to oscillate. Connected to the arms 38 and 39 are the springs 44 and 45, the angle lever 40 being actuated by a spring 46.

When the machine works, the angle lever 40 turns under the action of the cam 42 and the spring 46 about the pin 192. The fore part 193 of the lever 40 thereby acts on a shoulder 194 projecting from the arm, whereby the ratchet pawl 36 attached to the arm 38 turns the ratchet wheel 34 and thereby also the worm 32 attached to the same axle 105 and gearing with the worm wheel 30. The total weight of the matches lying on the bottoms 11 as well as that of the standards 12 and the frame 13 is transmitted through the cords 14 and the pulleys 15 to the axles 16 and 17 which are thereby turned, and from the said axles the movement is transmitted through the cog-wheels 18, 19 and 20, 21 to the axles 22 and 23 and the double arms 26, 27 attached thereto. By the ratchet pawls 26' the turning movement is transmitted to the ratchet wheels 28 and 29 and the worm wheels 30, 31, respectively, engaging the worms 32, 33, respectively. When the worms are turned in a direction for lowering the bottoms, the latter by gravity partake in the movement. When the frame 13 carrying the standards has finally arrived onto its base, the turning action on the axles 22, 23 ceases so that the ratchet pawls 26' of the double arms 26, 27 will simply glide on the teeth of the ratchet wheels 28, 29. When the bottoms are raised by hand, the pawls likewise glide over the teeth, since the axles 16, 17 and 22, 23 and the parts connected thereto thereby move in opposite directions. The ratchet wheels 28, 29 are provided with an odd number of teeth so that by using two diametrically opposite ratchet pawls the bottoms may be accurately adjusted in their upper positions before lowering without too great a number of teeth being required.

When the loose bottoms 11 have been moved into their lowermost positions and the trays are thus entirely filled, the carriage 10 is moved for placing a new series of trays below the movable partition walls. This movement of the carriage is performed in the following manner. Placed at each side of the carriage 10 is a rack 100, 101, respectively, engaged by a cog-wheel 102, 103, respectively. These cog-wheels are attached to a common axle 104 journaled in the frame below the carriage. For obtaining a suitable ratio of translation the axle 104 is driven by cog-wheels 106 and 107 from another axle 105 placed above the former. The axle 105 is driven from the crank 111 by the sprocket wheel 108, the chain 109 and the sprocket wheel 110. By turning the crank 111 in one or the other direction the carriage 10 is moved correspondingly, and by the said movement the piles of matches lying in the trays are cut off along the edge 95 or 96, respectively (depending on the direction of movement of the carriage) of the part of the machine frame lying above the trays. According as the filled trays are carried off, the matches lying between the movable partition walls will be supported on the raised bottoms of the empty trays.

For locking the carriage in predetermined working positions a pawl 113 is mounted on a pin 112 in the machine. This pawl is adapted to drop into recesses 98, 99 in the rack 100. These recesses are so placed relatively to the two series of trays in the carriage that they are just opposite the pawl 113 when the corresponding series of trays is in position to be filled. When the carriage is to be moved, the pawl is retracted from the recess by pulling a cord 97 or the like attached to the fore end of the pawl.

Another device for locking the carriage in position is shown in Fig. 2 of the drawings. Pivotally mounted in the machine frame are two arms 49 connected to each other by a rod 48. The arms are provided with notches adapted to engage pins 50 in the machine frame. The positions of the said pins are such as to cause the trays to take up the proper positions for filling, i. e. just below the laths 5.

When the series of trays below the machine has been filled, the machine should preferably be stopped if the carriage can not immediately be shifted. In order that the workman shall not be compelled to watch this moment, the machine is suitably provided with an automatic stopping device shown in Figs. 10 and 11. This stopping device acts in such a manner as to shift the driving belt from the fixed pulley 114 to the idle pulley 113 as soon as the loose bottoms of the trays have been lowered into their lowermost positions. The belt is caused to run on the desired pulley by a common belt shifter 115 which is actuated by a spiral spring 116 in a direction toward the idler 113. When the machine is to be started, the belt shifter is moved toward the fixed pulley until the shoulder 117 has passed the retaining pawl 118 mounted on a pin 120, said pawl being actuated by a spiral spring 119 tending to pull the point of the pawl toward the belt shifter 115. Extending from the pawl 118 is a tail-piece 121 actuated from above by a rod 122 bent at both ends, said rod being guided by clamps 123, 124 attached to the frame. The rod 122 is movable up and down in its longitudinal direction and acts with its weight on the tail-piece 121. The lower part of the rod 122 is actuated in a certain position by two other rods 125, 126 attached to the shiftable carriage 10, said rods acting in moving downward with their upper bent parts on the rod 122. The lower bent ends of the rods 125 and 126 are operated by shoulders 133 and 134 on the frames 13 carrying the standards 12. When one of the frames 13 with the standards 12 and the loose bottoms 11 resting thereon is lowered by the device hereinbefore described, the shoulders 133 or 134 carried by the said frame will press the rod 125 or 126, respectively, downward when the bottoms are at a short distance from their lowermost positions. By this movement the rod 122 is pulled downward and caused to press on the tail-piece 121 so that the pawl 118 is turned on its pin 120 and glides with its point past the shoulder 117. The belt shifter 115 will thus be released and under the action of the spring 116 glides toward the idle pulley shifting the belt and stopping the machine. The belt shifter 115 is movably mounted in two standards 135, 136 attached to the machine frame 6. The pawl 118 is mounted in a part 137 attached to the standard 135.

For automatically supplying match splints to the machine the following devices may be provided. Placed above the horizontally reciprocable magazine 1 is a stationary hopper 150 (Figs. 12 and 13). In the drawing it is shown supported by four standards 151 attached by screws to the machine frame 6 but obviously it may be supported otherwise, for instance from the ceiling of the machine house. In the bottom of the hopper is an opening of a suitable size, said opening being kept partially closed by a gate 153 movable about an axle 152. Extending from the gate 153 is an arm 154 connected by a link 155 to the magazine 1 so as to partake in the movement of the latter. When the magazine 1 is reciprocated, the link 155 is also reciprocated, and through the arm 154 the movement is transformed into a swinging movement of the gate 153. If desired, the link 155 may be attached to the eccentric from which the magazine is driven or it may be driven directly from the axle 43 by means of a separate eccentric or otherwise. Placed at each side of the gate 153 are two other gates 156 adapted to swing on hinges 157. Projecting from the said gates are arms 158 and extending from the said arms are strings 159 or the like attached to the axle 152. The gates 156 are adjustable in position by these strings which may be wound on the axle 152 or unwound therefrom by turning the same. By this means the gates 156 may be turned on the hinges 157 and the opening in the bottom between the gate 153 and the gates 156 may be increased or decreased by which the quantity of match splints supplied from the hopper into the magazine may be regulated. In order that the axle 152 shall not turn under the pulling action of the strings it is provided with a brake wheel 160. Bearing on the said brake wheel is a brake spring 161 attached to one side of the hopper. The turning of the axle 152 is performed by hand by means of the cranks 162.

The swinging movement of the gate 153 may be regulated by the point of attachment of the link 155 to the arm 154 being adjustable at a longer or shorter distance from the turning point 152.

The supplying of splints to the hopper may be performed by hand or by an elevator or the like.

Instead of placing the trays in a separate carriage they may be mounted, if desired, in the machine frame proper. The device for raising and lowering the bottoms may be the same as that hereinbefore described but it must be placed in the machine frame instead of in the carriage. The receiver 1 of the machine may also be wide enough to be able to fill two or more rows of trays at a time, the carriage having in each case twice that number of rows of trays.

Figs. 14–16 show a modification of the machine. In order to avoid the movable partition walls one or more rows of trays 51 (in the drawing one row only) are placed in a frame 52 adapted to reciprocate horizontally. Placed in the said frame is the hereinbefore described device for raising and lowering the bottoms 53 of the trays. The magazine 54 for taking up the match splints may be substantially like that hereinbefore described with the difference that it is mounted so as to be adapted to be raised and lowered. The raising and lowering of the magazine is performed by turning the axles 55 by means of the crank 56 whereby cords 57 or the like attached to the edges of the magazine are wound around the pulleys 58 or unwound therefrom. For guiding the magazine the bearings 59 for the axles 55 are provided with suitable projections. The standards 61 for raising the movable bottoms 53 are attached to rods 62 bent at right angles, said rods being movable by the raising and lowering device hereinbefore described but not illustrated in Figs. 14-16. The frame 52 is carried by four standards 63 resting with their lower ends in suitable bearings on the machine frame 64.
In this machine only such a quantity of match splints may be filled into the magazine as may be received in parallel positions in the trays. When the trays have been filled, the machine must be stopped, whereupon the magazine 54 is raised and the filled trays are removed and exchanged by empty ones.

Instead of being provided with loose bottoms the trays may be built as shown in Figs. 17-19. In the fixed bottoms of the trays are slots 65 leaving at the middle a bridge for supporting those match splints having proper positions. The match splints dropping on end from the magazine 54 into the trays fall through the slots 65 and through corresponding openings in the bottom of the frame 52. In this manner the trays may be filled without the provision of loose bottoms adapted to be raised to the upper edge of the tray. In this case, however, the longitudinal laths 66 of the magazine must be provided with tongues projecting into the trays so that the trays and tongues will form deep compartments or cells. When the trays have been filled, the magazine and the trays are raised, the trays are removed and exchanged. In such a machine the loose bottoms and, on account thereof, all the devices for raising and lowering same are dispensed with. Suitably a loose bottom may be placed under the machine for collecting the through-falling match splints. The match splints collected by the said bottom are thereupon again brought into the magazine 54.

In the constructional form shown in Figs. 1 to 13, the devices for raising and lowering the bottoms are placed on the carriage, as hereinbefore described. The machine needs however only one device of the said kind, if the same is placed in the machine frame, whereby one set of trays may be filled while another set just filled is being exchanged by an empty one. In this case the carriage may be arranged as shown in Figs. 10 and 11. On the carriage 67 the trays 68 are placed in two or more rows. The carriage runs on rollers 69 journaled in the machine frame in such positions that the trays will take up the same positions as before. This embodiment has however the drawback that the loose bottoms can not be raised until the carriage has been placed in position by which some time is lost. However, inasmuch as only one device for raising and lowering the bottoms is required the machine will at the same time be simpler and cheaper.

When a set of trays has been filled and is to be exchanged, a set of knives 47 (Figs. 22 and 23) is inserted by hand just above the trays. To this end the said knives are inserted into grooves in the laths 5. These knives prevent the splints lying in the cellbox from dropping when the trays are being exchanged. When the trays have been exchanged, the knives are again removed by hand and the same course is repeated. In the embodiment first described, in which the trays are provided with movable bottoms adapted to be placed at the top of the trays during exchange, such knives are not required.

I claim:

1. In a machine of the kind described, the combination of a reciprocable cell-box comprising vertical rectangular cells open at their tops and bottoms and adapted to be continuously kept filled with match splints lying parallel therein, means for reciprocating the said box horizontally in the direction of the walls of the cells corresponding to the longitudinal direction of the match splints, trays removably placed in the machine below the said box, splint-carrying bottoms movable in the said trays, and means for raising and automatically lowering the said bottoms.

2. In a machine of the kind described, the combination of a reciprocable cell-box, means for reciprocating the said box, trays removably placed in the machine below the said box, and partition walls swingably placed between the cell-box and the trays and partaking with their upper ends in the movement of the cell-box.

3. In a machine of the kind described, the combination of a reciprocable cell-box, means for reciprocating the said box, trays removably placed in the machine below the said box, a frame movable vertically below the said trays, means for raising and automatically lowering the said frame, standards projecting from the said frame into the trays, and bottoms carried by the said standards.

4. In a machine of the kind described the combination of a reciprocable cell-box comprising vertical rectangular cells open at their tops and bottoms and adapted to be continuously kept filled with match splints lying parallel therein, means for reciprocating the said box horizontally in the direction of the walls of the cells corresponding to the longitudinal direction of the match 1 splints, trays removably placed in the machine below the said box, partition walls swingably placed between the cell-box and the trays, splint-carrying bottoms movable in the said trays, and means for raising and automatically lowering the said bottoms.

5. In a machine of the kind described the combination of a reciprocable cell-box comprising vertical rectangular cells open at their tops and bottoms and adapted to be continuously kept filled with match splints lying parallel therein, means for reciprocating the said box horizontally in the direction of the walls of the cells corresponding to the longitudinal direction of the match splints, trays removably placed in the machine below the said box, partition walls swingably placed between the cell-box and the trays, a frame movable vertically below the said trays, means for raising and automatically lowering the said frame, standards projecting from the said frame into the trays, and bottoms carried by the said standards.

6. In a machine of the kind described the combination of a reciprocable cell-box comprising vertical rectangular cells open at their tops and bottoms and adapted to be continuously kept filled with match splints lying parallel therein, means for reciprocating the said box horizontally in the direction of the walls of the cells corresponding to the longitudinal direction of the match splints, a carriage adapted to be placed in different positions below the said box, trays carried by the said carriage in positions allowing different sets of trays to be placed in splint-receiving positions below the said cell-box, bottoms movable in the said trays, and means for raising and automatically lowering the said bottoms.

7. In a machine of the kind described, the combination of a reciprocable cell-box, means for reciprocating the said box, a carriage adapted to be placed in different positions below the said box, trays carried by the said carriage in positions allowing different sets of trays to be placed in splint-receiving positions below the said cell-box, bottoms movable in the said trays, and means carried by the said carriage for raising and automatically lowering the said bottoms.

8. In a machine of the kind described, the combination of a reciprocable cell-box, means for reciprocating the said box, a carriage adapted to be placed in different positions below the said box, trays carried by the said carriage in positions allowing different sets of trays to be placed in splint-receiving positions below the said cell-box, frames movable vertically in the said carriage below the said trays, means for independently raising and automatically lowering the said frames, standards projecting from the said frames into the trays, and bottoms carried by the said standards.

9. In a machine of the kind described, the combination of a reciprocable cell-box, a hopper placed above the said cell-box, adjustable means for automatically feeding match splints from the hopper into the cell-box, means for reciprocating the said box, and trays removably placed in the machine below the said box for holding the parallelly arranged match splints.

10. In a machine of the kind described the combination of a reciprocable cell-box, means for reciprocating the said box, trays removably placed in the machine below the said box for holding the parallelly arranged match splints, and means for automatically stopping the machine when the trays have been filled.

11. In a machine of the kind described, the combination of a reciprocable cell-box, means for reciprocating the said box, trays removably placed in the machine below the said box, splint-carrying bottoms movable in the said trays, means for raising and automatically lowering the said bottoms, and means for automatically stopping the machine when the said bottoms arrive in their lowermost positions.

12. In a machine of the kind described, the combination of a reciprocable cell-box comprising vertical rectangular cells open at their tops and bottoms and adapted to be continuously kept filled with match splints lying parallel therein, means for reciprocating the said box horizontally in the direction of the walls of the cells corresponding to the longitudinal direction of the match splints, trays open at one of the sides disclosing the ends of the splints, said trays being placed independently and removably, adjacent to the other, below the said box, splint-carrying bottoms movable vertically in the said trays, and means for automatically lowering the said bottoms.

13. In a machine of the kind described, the combination of a reciprocable cell-box comprising vertical rectangular cells open at their tops and bottoms and adapted to be continuously kept filled with match splints lying parallel therein, means for reciprocating the said box horizontally in the direction of the walls of the cells corresponding to the longitudinal direction of the match splints, a carriage adapted to be placed in different positions below the said box, trays open at one of the sides disclosing the ends o the splints, said trays being placed independently and removably in the said carriage in positions allowing different sets of trays to be placed in splint-receiving positions below the said cell-box, splint-carrying bottoms movable vertically in the said trays, and means for automatically lowering the said bottoms.

14. In a machine of the kind described, the combination of a reciprocable cell-box comprising vertical rectangular cells open at their tops and bottoms and adapted to be continuously kept filled with match splints lying parallel therein, means for reciprocating the said box horizontally in the direction of the walls of the cells corresponding to the longitudinal direction of the match splints, a carriage adapted to be placed in different positions below the said box, trays open at one of the sides disclosing the ends of the splints, said trays being placed independently and removably in the said carriage in positions allowing different sets of trays to be placed in splint-receiving positions below the said cell-box, means for locking the carriage in different splint-receiving positions, splint-carrying bottoms movable vertically in the said trays, and means for automatically lowering the said bottoms.

JOHN GOTTHARD SJÖSTRÖM.

Witnesses:
 Aug. Sörensen,
 Karl Runcskog.